United States Patent Office 3,345,396
Patented Oct. 3, 1967

---

3,345,396
ORGANO-SUBSTITUTED BORAZINES
Elmar-Manfred Horn, Kurten, and Hans Niederprüm, Monheim, Germany, assignors to Farbenfabriken Bayer Aktiengesellschaft, Leverkusen, Germany, a German corporation
No Drawing. Filed Mar. 9, 1965, Ser. No. 438,399
Claims priority, application Germany, Mar. 14, 1964,
F 42,316
19 Claims. (Cl. 260—462)

ABSTRACT OF THE DISCLOSURE

A process is disclosed for preparing a series of cyclic-substituted borazoles of the formula

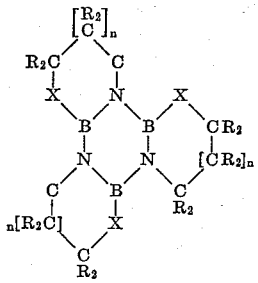

wherein X is O, S or $NR^6$; $R^2$, $R^3$ and $R^4$ are each hydrogen, halogen, alkyl, cycloalkyl, aryl, alkoxy, aryloxy or nitro; $n$ is 0 or 1 and where $n$ is 0, $R^2$ and $R^3$ may be joined to form phenyl or naphthyl which can also be substituted, $R^5$ is hydrogen, halogen, alkyl, cycloalkyl, aryl, alkoxy, aryloxy, nitro, alkyl and/or phenyl substituted silyl or each $R^5$ is a dialkyl-silyl-methyl linked to the other via an oxygen atom to form a disiloxane, and $R^6$ is hydrogen, alkyl, cycloalkyl or aryl by reacting a compound of the formula

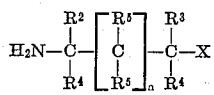

wherein X is OH, SH or $NHR^6$, $R^2$, $R^3$, $R^4$, $R^5$, $R^6$ and $n$ are as above defined, with a mixture of a borohydride and a boron halide or a boron halide addition product at a temperature above 20° C. and preferably between 40 and 100° C.

---

This invention relates to organo-substituted borazines, and to a process for their production. In particular it is concerned with cyclic-substituted borazoles of the general formula

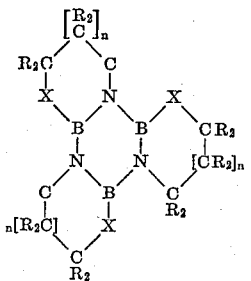

wherein X is O, S or N–R, R being the same or different substituents, including hydrogen, $n$ is 0 or 1, and if $n$ is equal to 0, the two other carbon atoms may be members of a second ring.

These cyclic-substituted borazoles are valuable intermediate products, for example, for the production of boron-containing polymers which, inter alia, exhibit neutron-absorbing properties. They are furthermore useful as additives for fuels and lubricants, and are also of interest as plant protective agents.

According to the present invention, a process for the production of a cyclic-substituted borazine comprises reacting a compound of the general formula

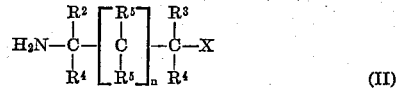

in which X is an OH, SH or $NHR^6$ group, $R^2$, $R^3$ and $R^4$ are hydrogen, or the same or different halogen, alkyl, cycloalkyl, aryl, alkoxy, aryloxy and/or nitro radicals, $n$ is either 0 or 1, and, if $n$ is equal to 0, $R^2$ and $R^3$ can be linked to give a phenyl or naphthyl radical, which may be substituted with one or more identical or different radicals of the type given above for $R^2$, $R^3$ and $R^4$, $R^5$ has the same meaning as $R^2$, $R^3$ and $R^4$, or is an alkyl- and/or phenyl-substituted silyl radical, or each $R^5$ is a dialkyl-silyl-methyl radical linked to the other via an oxygen atom to form a disiloxane, and $R^6$ is hydrogen or an alkyl, cycloalkyl or aryl radical, at a temperature above 20° C., preferably between 40 and 100° C., with a mixture of a borohydride and a boron halide or a boron halide addition product.

It has been found that the process for the production of cyclic-substituted borazines already proposed can be carried out in a simpler and more economical way when the amines of the general Formula II are reacted with borohydrides and boron halides. This reaction proceeds very smoothly and enables the cyclic-substituted borazines to be obtained in high yields. Besides hydrogen, only sodium tetrafluoborate, for example, is formed as a by-product, and this can be worked up according to known methods to boron trifluoride or to a boron trifluoride addition product, to serve again as a starting material.

When tris - (4,5 - benzo - 1,3,2 - thiazo - borolo) - borazine (III) is produced, the process according to the invention can be illustrated, for example, by the following Equation 1:

(1)

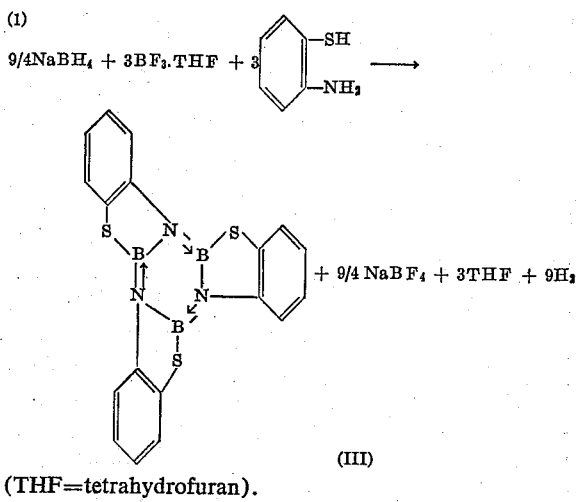

(THF=tetrahydrofuran).

Processes for the production of the cyclic-substituted borazines mentioned, by way of example, in Equation 1 are known. Thus, in Abstracts of Papers, 61P, 138th Meeting, American Chemical Society, in the Journal of Organic Chemistry, 27 (11), 3848–3851/1962, and in U.S. patent specification 3,016,402 there is described a method for the production of tris-(4,5-benzo-1,3,2-oxazaborolo)-borazines and tris-(4,5-benzo-1,3,2-thiazaborolo)-borazines, respectively, which may be substituted on the benzene nucleus. This process, however, which is based on the reaction of optionally nuclear-substituted o-aminophenols or optionally nuclear-substituted o-aminothiophenols with boron trichloride or boron tribromide, requires not only long reaction times, but is hampered by the strong corroding properties of the hydrogen halides formed as secondary products, especially when carried out on a technical scale.

A variant of this boron halide reaction [cf. the Journal of Organic Chemistry, 26 (11), 4632–4634/1961] consists in reacting orthoboric acid esters with optionally nuclear-substituted o-aminophenols or amino-alcohols. However, when this process is carried out on a technical scale, great difficulties also occur, due to the ready hydrolyzability of the orthoboric acid esters and the low reaction velocity.

The cyclic-substituted borazines obtainable according to the present process can be represented by the general formula

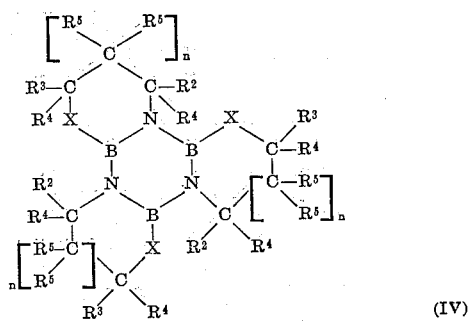

(IV)

wherein X is O, S or $NR^6$; $R^2$, $R^3$ and $R^4$ are hydrogen or the same or different halogen, alkyl, cycloalkyl, aryl, alkoxy, aryloxy and/or nitro radicals, $n$ is either 0 or 1, and, if $n$ is 0, $R^2$ and $R^3$ may be linked to form a phenyl or naphthyl radical which may be substituted by one or more identical or different radicals of the type given above for $R^2$, $R^3$ and $R^4$, $R^5$ has the same meaning as $R^2$, $R^3$ and $R^4$, or is an alkyl- and/or phenyl-substituted silyl radical, or each $R^5$ is a dialkyl-silyl-methyl radical linked to the other via an oxygen atom to form a disiloxane, and $R^6$ is hydrogen or an alkyl, cycloalkyl or aryl radical.

The amines which can be used in the process of the present invention, and which have the general Formula II can be divided into the following groups:

(a) Amino-alcohols, aminothioalcohols or diamines of alkylenes with a chain length of 2–10, preferably 1–4, carbon atoms, in which the $NH_2$ groups and the OH or SH or $NH_2$ or $NHR^6$ groups are separated from one another by 2 or 3 carbon atoms. In the above mentioned compounds the substituents may be halogen atoms, preferably chlorine or bromine atoms, nitro groups, alkyl or alkoxy groups, preferably with 1–3 carbon atoms, cycloalkyl groups, preferably cyclohexyl groups, or aryl or aryloxy groups, preferably phenyl groups;

(b) Aminophenols, aminonaphthols, aminothiophenols, aminothionaphthols, phenylene-diamines and naphthylene-diamines substituted in the ortho- or meta-position, as well as the derivatives of these compounds substituted by the atoms and groups described under (a);

(c) 3-amino-propane-1-ols and 1,3-propylene-diamines substituted in the 2-position by alkylsilyl or phenylsilyl, whereby two silyl radicals can also be linked via an oxygen atom to give a disiloxane.

As examples, there may be mentioned: 2-aminoethane-1-ol, 3-aminopropane-1-ol, 3-aminobutane-1-ol, 2-aminobutane-1-ol, 3-aminopentane-2-ol, 1-amino-2-methyl-butane-2-ol, 4-amino-2-methyl-pentane-5-ol, 4-amino-2,4-dimethylpentane - 2 - ol, 5-amino-2,5-dimethyl-hexane-3-ol, 4-amino-2-methyl-5-ethyl-heptane-5-ol, 3-chloro-1-aminopropane-2-ol, 3 - amino-1-diethylaminopropane - 2 - ol, 3-amino-1-hydroxy-2-methoxy-propane, 1-phenyl-2-aminoethane-1-ol, 2-aminophenol, 4-chloro-2-aminophenol, 3,4-dichloro-2-aminophenol, 3,4,6-trichloro-2-aminophenol, 3,5-dibromo-2-aminophenol, 4-nitro - 2 - aminophenol, 6-bromo-4-nitro-2-aminophenol, 4,5 - dimethyl - 2 - aminophenol, 3,4,5,6 - tetrachloroaminophenol, 2 - aminonaphthol-(3); 1,2-diaminoethane, 1,3-diaminopropane, 1,2-diaminobutane, 1,3-diaminobutane, 2,4-diaminopentane, 2,3-diaminooctane, 1,3-diamino-2,2-dimethyl-propane, 1,2-diamino-2-methyl-propane, 1,3-diamino - 2 - methyl-butane, 2,3-diamino-2-methyl-butane, 3,4-diamino-3,4-dimethylhexane, 2-bromo-1,3-diaminopropane, 1,2 - diamino-4-dimethylaminobutane, 1,3-diamino - 2 - phenyl-propane, 1-amino-2-methylaminoethane, 3 - amino-1-ethylaminopropane, 3-amino-1-propylaminopropane, 3 - amino-1-octylaminopropane, 3 - amino-1-ethylamino-2-methyl-propane, 1 - amino - 3 - cyclohexylaminopropane, o - phenylene-diamine, 4-chloro-1,2-diaminobenzene, 4 - chloro-6-methyl-1,2-diaminobenzene, N-methyl - o - phenylene-diamine, 5-bromo-2-ethylaminoaniline, naphthylene-2,3-diamine, 2-amino-ethane-1-thiol, 2-amino-propane-2-thiol, 2-amino-butane-3-thiol, 2-amino-thiophenol, 3-chloro-2-aminothiophenol, 3-chloro-5-methyl-2-aminothiophenol, and 3-aminopropane-1-ols and 1,3-propylene-diamines substituted in the 2-position by alkyl- or phenyl-silyl, for example:

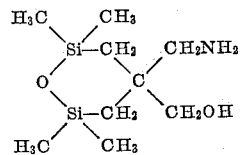

4-aminoethyl-4-hydroxymethyl - 1 - oxa - 2,2,6,6 - tetramethyl-2,6-disila-cyclohexane,

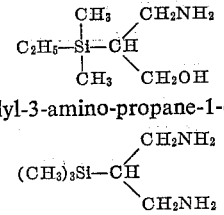

2-ethyldimethylsilyl-3-amino-propane-1-ol,

2-trimethylsilyl-propylene - 1,3 - diamine or 2 - phenyldimethyl-silyl-propylene-1,3-diamine.

The boron halides serving as starting materials in the process according to the invention possess the general formula $$BX_3$$

wherein X is F, Cl, Br or I. Because of easier measurement, it is expedient to work with addition products of the boron halides, especially those addition products with ethers, such as boron trifluoride/diethyl ether and boron trifluoride/tetrahydrofuran. For reasons of economy boron trifluoride and its addition compounds with ethers are preferred.

Also because of economic considerations the alkali metal borohydrides, especially the inexpensive sodium borohydride, are preferably used, but other alkali metal or alkaline earth metal borohydrides such as lithium borohydride, potassium borohydride, calcium or strontium borohydride can also be used for the reaction.

The use of solvents or dispensing agents, e.g. aliphatic and cylic ethers, such as dimethyl ether, diethyl ether etc., preferably tetrahydrofuran or tetrahydropyran, is advantageous.

The process of the present invention is carried out at temperatures above 20° C., preferably at a temperature between 40 and 100° C. The low reaction temperatures enable the process to be carried out wtihout pressure, but it is also possible to work under pressure, e.g. under a pressure of nitrogen. The reaction advantageously takes place stoichiometrically in accordance with the above reaction Equation 1, but it is also possible to work with an excess of one of the reaction components.

The process according to the present invention provides a technical advance from many points of view. Processes previously described for the production of cyclic-substituted borazines necessitated high temperatures, yielded strongly corroding by-products and/or required long reaction times. The process according to the invention, on the other hand, permits the production of cyclic-substituted borazines in high yields from readily obtainable and inexpensive starting materials under mild and readily controllable reaction conditions.

The following examples are given for the purpose of illustrating the present invention.

Example 1

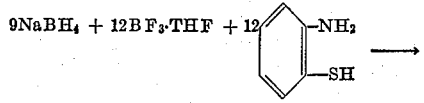

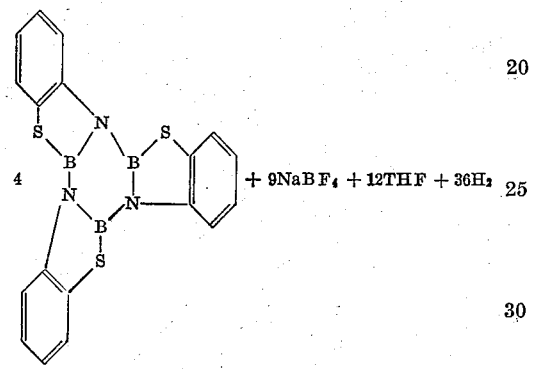

In a round-bottomed flask equipped with stirrer, immersed thermometer and dropping funnel, there are added to a suspension of 27.3 g. (0.72 mol) sodium borohydride in one litre dry tetrahydrofuran, 100 g. (0.8 mol) o-aminothiophenol 112 g. (0.8 mol) boron trifluoride-tetrahydrofuran are then introduced dropwise into this reaction mixture over a period of about 30 minutes. The reaction is completed by heating the flask contents under reflux for about 2 hours, and the solvent is then distilled off. The solid residue is extracted with chlorobenzene. After concentration of the extract, there are obtained 93 g. of a pale yellow, asbestos-like material identified by the IR-spectrum as tris-(4,5-benzo-1,3,2-thiazaborolo)-borazine which, after recrystallization from chlorobenzene, is pure white in color and possesses a melting point of 343–344° C. The mass spectrometric molecular weight determination gave a value of 399 units.

Example 2

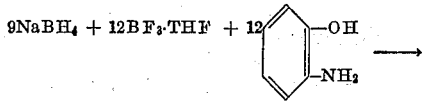

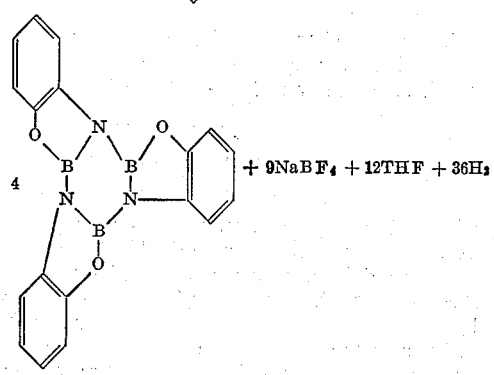

In the apparatus described in the previous example there are slowly added to a suspension of 68.4 g. (1.8 mols) sodium borohydride in two liters dry tetrahydrofuran, 218 g. (2 mols) o-aminophenol, and into this mixture 280 g. (2 mols) boron trifluoride-tetrahydrofuran are then introduced dropwise, with stirring, over a period of about 40 minutes. The temperature of the reaction mixture hereby rises to about 45° C., with the evolution of hydrogen. The reaction is completed by boiling the flask contents under reflux for about three hours, and the solvent is then distilled off under normal pressure. From the solid residue tris-(4,5-benzo-1,3,2-oxazaborolo)-borazine, formed practically quantitatively, is extracted with hot dioxan. Upon cooling, there separates from the clear filtrate of this extraction the white to pale-brownish, asbestos-like tris-(4,5-benzo-1,3,2-oxazaborolo)-borazine, identified by the IR-spectrum; M.P. 280–286° C. (decomposition). The mass spectrometric molecular weight determination provides a value of 351 units.

*Analysis.*—Theoretical: 9.23% boron. Found: 9.15% boron.

Example 3

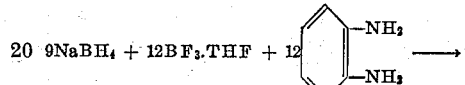

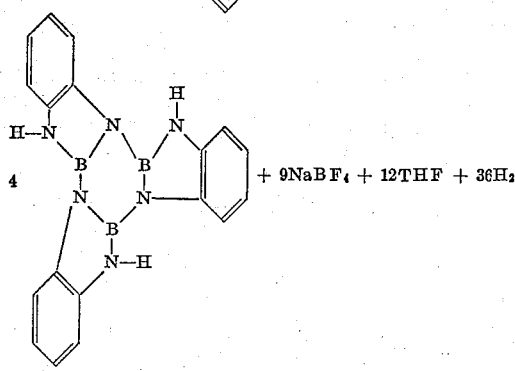

By a similar procedure to that described in the previous examples, there is obtained from 27.4 g. (0.72 mol) sodium borohydride, 86.5 g. (0.8 mol) o-phenylene-diamine and 112 g. (0.8 mol) boron trifluoride-tetrahydrofuran in 900 ml. tetrahydrofuran, the white to pale-brownish, asbestos-like tris-(4,5 - benzo - 1,3,2 - diazaborolo)-borazine in 93.6% yield, identified by the IR-spectrum; M.P. 374–375° C. (decomposition). The mass spectrometric molecular weight determination gave a value of 348 units.

Example 4

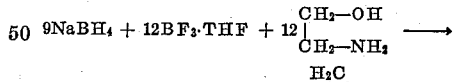

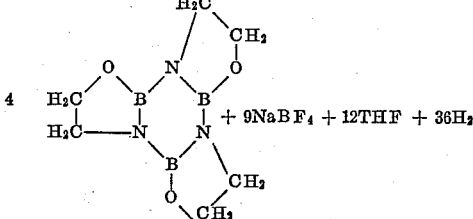

To a suspension of 137 g. (3.6 mols) sodium borohydride in 3.5 liters dry tetrahydrofuran there are added 244 g. (4 mols) 2-aminoethanol. 560 g. (4 mols) boron trifluoride-tetrahydrofuran are then introduced dropwise, with stirring, into this mixture over a period of about 30 minutes. The temperature of the reaction mixture hereby rises to about 60° C. with evolution of hydrogen. The reaction mixture is subsequently briefly boiled under resflux, the tetrahydrofuran is distilled off under normal pressure, the remaining volatile components are removed in a vacuum and from the solid, white distillation residue, tris-(1,3,2-oxazaborolidino)-borazine obtained practically quantitatively, is sublimed in a vacuum. The borazine purified in this way and identified by the IR-spectrum has a melting point of 203–205° C. The mass spectrometric molecular weight determination gave a value of 207 units; compared with the mass 206, the intensity of the mol ions amounts to 35%.

*Example 5*

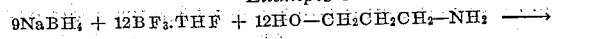

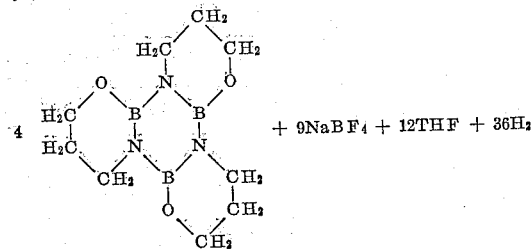

By a method analogous to that of Example 4 there is obtained, in a quantitative yield, from 68.5 g. (1.8 mols) sodium borohydride, suspended in 2.5 liters dry tetrahydrofuran, 150 g. (2 mols) 3-aminopropanol and 280 g. (2 mols) boron trifluoride-tetrahydrofuran, the white tris-(1,3,2-oxazaborinano)-borazine with a melting point of 162–164° C. identified by the IR-spectrum. The mass spectrometric molecular weight determination gave a value of 249 units; compared with the mass 248 the intensity of the mol ion amounts to 55%.

*Example 6*

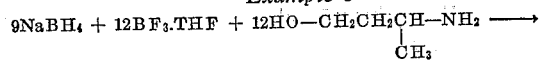

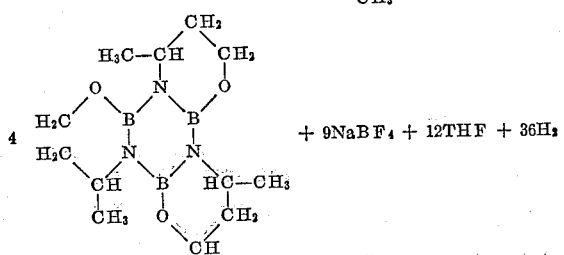

By a method analogous to that of Examples 4 and 5, there is formed, practically quantitatively, from 68.5 g. (1.8 mols) sodium borohydride, suspended in 2 liters tetrahydrofuran, 178 g. (2 mols) 3-aminobutane-1-ol and 280 g. (2 mols) boron trifluoride-tetrahydrofuran, the white tris-(4-methyl-1,3,2-oxazaborinano)-borazine, identified by the IR-spectrum; M.P. 67–68° C. The mass spectrometric molecular weight determination gave a value of 290±1 units.

*Example 7*

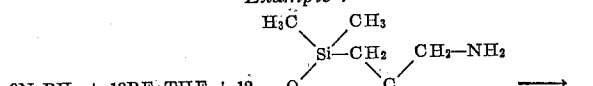

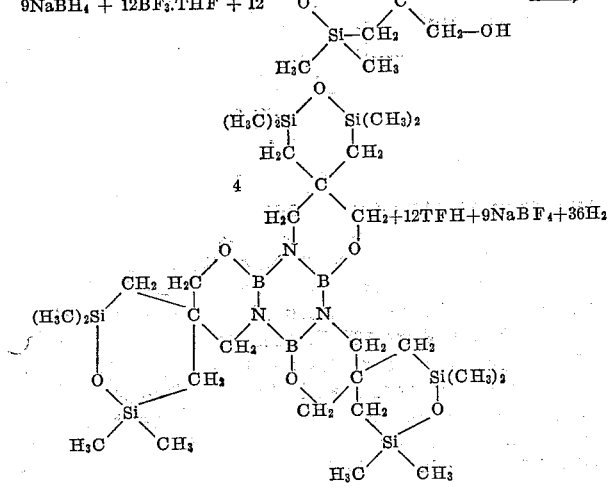

To a suspension of 6.85 g. (0.18 mol) sodium borohydride in 300 ml. tetrahydrofuran, there are added 46.6 g. (0.2 mol) 4-hydroxymethyl-4-aminomethyl-1-oxa-2,2,6,6 - tetramethyl - 2,6 - disila-cyclohexane and 28 g. (0.2 mol) boron trifluoride-tetrahydrofuran are then introduced dropwise into this suspension, with stirring, over a period of about 20 minutes. The temperature of the reaction mixture hereby rises to about 45° C. The flask contents are subsequently boiled under reflux for about three hours, allowed to cool and centrifuged; the THF is distilled from the clear tetrahydrofuran solution under normal pressure and the volatile residues still entrained are removed in a vacuum at 90–100° C. There are thus obtained 46.5 g., corresponding to a yield of 96.5% theoretical, tris-{[5-(1'-oxa - 2',2',6',6' - tetramethyl-2',6' - disilacyclo-hexanyl)]-1,3,2-oxazaborinano}-borazine, identified by the IR-spectrum, M.P. 100–106° C.

*Analysis.*—Theoretical: 4.5% boron. Found: 4.44% boron.

We claim:

1. Process for the production of cyclic-substituted borazines having the formula:

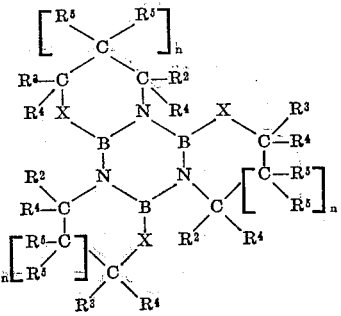

wherein

X is a member selected from the group consisting of O, S, and $NR^6$;

$R^2$, $R^3$, and $R^4$ are substituents of the group consisting of hydrogen, halogen, alkyl, cycloalkyl, aryl, alkoxy, aryloxy, and $NO_2$;

$n$ is selected from the class of 0 and 1, wherein, when $n$ is 0, $R^2$ and $R^3$ may be linked to form a member selected from the group consisting of phenyl, naphthyl, and substituted derivatives thereof, wherein the substituents are selected from the group consisting of halogen, alkyl, cycloalkyl, aryl, alkoxy, aryloxy, and nitro;

$R^5$ is a member selected from the group consisting of hydrogen, halogen, alkyl, cycloalkyl, aryl, alkoxy, aryloxy, nitro, alkyl-substituted silyl, aryl-substituted silyl, and wherein each $R^5$ may be dialkyl-silyl-methyl linked to the other $R^5$ substituent on the same carbon atom via an oxygen atom to form a disiloxane;

$R^6$ is a member selected from the group consisting of hydrogen, alkyl, cycloalkyl and aryl, which comprises reacting an amine having the formula:

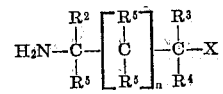

wherein X is a member selected from the group consisting of OH, SH and $NHR^6$ wherein $R^2$, $R^3$, $R^4$, $R^5$, $R^6$, and $n$ are as defined above, with a mixture of a member selected from the group consisting of alkali metal borohydride and alkaline earth metal borohydride, and a member selected from the group consisting of boron trihalides and boron trihalide addition products with ethers, at a temperature of above 20° C.

2. Process according to claim 1, wherein the reaction temperature is between 40 and 100° C.

3. Process according to claim 1, wherein the alkali-metal-borohydride is sodium borohydride.

4. Process according to claim 1, wherein the boron trihalide is boron trifluoride.

5. Process according to claim 1, wherein the reaction is carried out in the presence of a liquid selected from the group consisting of aliphatic and cyclic ethers.

6. Process according to claim 5, wherein the reaction is carried out in a liquid selected from the group consisting of tetrahydrofuran and tetrahydropyran.

7. Process for the production of cyclic-substituted borazines, the process which comprises reacting an organic compound selected from the group consisting of o-aminophenols, o-aminonaphthols, o-aminothiophenols, o-aminothionaphthols, o-phenylene diamines, o-naphthylene diamines, amino-alcohols, aminothiols and aliphatic diamines, said amino-alcohols, aminothiols and aliphatic diamines having 2 to 3 carbon atoms in the chain, and halogen, alkyl, cycloalkyl, aryl, alkyl-silyl, phenyl-silyl, alkyl-siloxyl and phenyl-siloxyl-substituted derivatives thereof with a mixture of a borohydride selected from the group consisting of alkali metal borohydrides, alkaline earth metal borohydrides and a boron compound selected from the group consisting of boron trihalide and boron trihalide addition compounds with ethers, at a temperature above 20° C.

8. Process according to claim 7, wherein the reaction temperature is between 40 and 100° C.

9. Process according to claim 7, wherein the alkali-metal-borohydride is sodium borohydride.

10. Process according to claim 7, wherein the boron trihalide is boron trifluoride.

11. Process according to claim 7, wherein the reaction is carried out in the presence of a liquid selected from the group consisting of aliphatic and cyclic ether.

12. Process according to claim 11, wherein the reaction is carried out in a liquid selected from the group consisting of tetrahydrofuran and tetrahydropyran.

13. Process for the production of tris-(4,5-benzo-1,3,2-triazaborolo)-borazine, which comprises reacting o-aminothiophenol with a mixture of sodium borohydride and boron trifluoride-tetrahydrofuran in the presence of tetrahydrofuran at a temperature above 20° C.

14. Process for the production of tris-(4,5-benzo-1,3,2-oxaza-borolo)-borazine, which comprises reacting o-aminophenol with a mixture of sodium borohydride and boron trifluoride-tetrahydrofuran at a temperature above 20° C.

15. Process for the production of tris-(4,5-benzo-1,3,2-diazaborolo)-borazine which comprises reacting o-phenylene-diamine with a mixture of sodium borohydride and boron trifluoride-tetrahydrofuran in the presence of tetrahydrofuran at a temperature above 20° C.

16. Process for the production of tris-(1,3,2-oxaza-borolidino)-borazine, which comprises reacting 2-aminoethanol with a mixture of sodium borohydride and boron trifluoride-tetrahydrofuran in the presence of tetrahydrofuran at a temperature above 20° C.

17. Process for the production of tris-(1,3,2-oxaza-borinano)-borazine, which comprises reacting 3-aminophenol with a mixture of sodium borohydride and boron trifluoride-tetrahydrofuran in the presence of tetrahydrofuran at a temperature above 20° C.

18. Process for the production of tris-(4-methyl-1,3,2-oxazaborinano)-borazine, which comprises reacting 3-aminobutane-1-ol with a mixture of sodium borohydride and boron trifluoride-tetrahydrofuran in the presence of tetrahydrofuran at a temperature above 20° C.

19. Process for the production of tris-{[5-(1'-oxa-2',2',6',6', - tetramethyl - 2',6' - disilacyclo-hexanyl)]-1,3,2-oxazaborinano}-borazine, which comprises reacting 4 - hydroxymethyl - 4 - aminomethyl - 1 - oxa-2,2,6,6-tetramethyl-2,6-disila-cyclohexane with a mixture of sodium borohydride and boron trifluoride-tetrahydrofuran in the presence of tetrahydrofuran at a temperature above 20° C.

References Cited
UNITED STATES PATENTS 3,045,038   7/1962   Brotherton et al. _____ 260—462

CHARLES B. PARKER, *Primary Examiner.*

B. BILLIAN, *Assistant Examiner.*

UNITED STATES PATENT OFFICE

CERTIFICATE OF CORRECTION

Patent No. 3,345,396                  October 3, 1967

Elmar-Manfred Horn et al.

It is hereby certified that error appears in the above numbered patent requiring correction and that the said Letters Patent should read as corrected below.

Column 6, line 71, for "resflux" read -- reflux --; column 7, lines 33 to 40, in the formula, the lowest position "CH" read -- $CH_2$ --; same column 7, Example 7, about line 62, for "+12TFH" read -- +12THF --; column 8, lines 60 to 64, the lower left-hand side of the formula, for "$R^5$" read -- $R^4$ --.

Signed and sealed this 22nd day of October 1968.

(SEAL)
Attest:

Edward M. Fletcher, Jr.                  EDWARD J. BRENNER
Attesting Officer                        Commissioner of Patents